United States Patent

Keys et al.

Patent Number: 5,181,341
Date of Patent: Jan. 26, 1993

[54] VARIABLE GAP FILLING SYSTEM

[75] Inventors: James F. Keys, West Bloomfield; Douglas C. Larsen, Milford, both of Mich.

[73] Assignee: The Standard Products Company, Cleveland, Ohio

[21] Appl. No.: 523,052

[22] Filed: May 14, 1990

[51] Int. Cl.$^5$ ................................................ E06B 7/16
[52] U.S. Cl. .......................................... 49/477; 49/490; 404/49
[58] Field of Search ................. 49/477, 480, 481, 485, 49/488, 490, 497, 498; 404/49, 64, 69

[56] References Cited

U.S. PATENT DOCUMENTS

| | | | |
|---|---|---|---|
| 2,832,618 | 4/1958 | Knoll et al. | 49/477 X |
| 3,172,166 | 3/1965 | Imbrecht | 49/477 X |
| 3,178,779 | 4/1965 | Clark et al. | 49/477 |
| 3,289,352 | 12/1966 | Heilweil et al. | 49/485 |
| 3,359,687 | 12/1967 | Wallace | 49/477 |
| 3,378,956 | 4/1968 | Parks et al. | 49/485 |
| 3,413,389 | 11/1968 | Footner | 49/485 X |
| 3,598,026 | 8/1971 | Johnson | 404/49 |
| 3,837,700 | 9/1974 | Van Slyke | 49/477 X |
| 4,160,421 | 7/1979 | Heinen | 49/485 X |
| 4,335,075 | 6/1982 | Kackos | 49/477 X |
| 4,371,175 | 2/1983 | Van Dyk, Jr. | 49/477 X |
| 4,490,943 | 1/1985 | McLaughlin | 49/481 X |
| 4,644,698 | 2/1987 | Gerdes et al. | 49/485 X |
| 4,741,542 | 5/1988 | Kimerly | 49/477 X |
| 4,813,184 | 3/1989 | Weimar | 49/477 |
| 4,989,369 | 2/1991 | Maass | 49/477 |

FOREIGN PATENT DOCUMENTS 2253140 12/1973 Fed. Rep. of Germany ........ 404/49

Primary Examiner—Renee S. Luebke
Assistant Examiner—Jerry Redman
Attorney, Agent, or Firm—Harness, Dickey & Pierce

[57] ABSTRACT

A variable gap sealing article for sealing between a first surface and a second surface has an elongated body portion with a resilient contractible portion and an expandable portion. The article fills a gap between the surfaces by expanding the expandable portion and compressing the contractible portion.

22 Claims, 1 Drawing Sheet

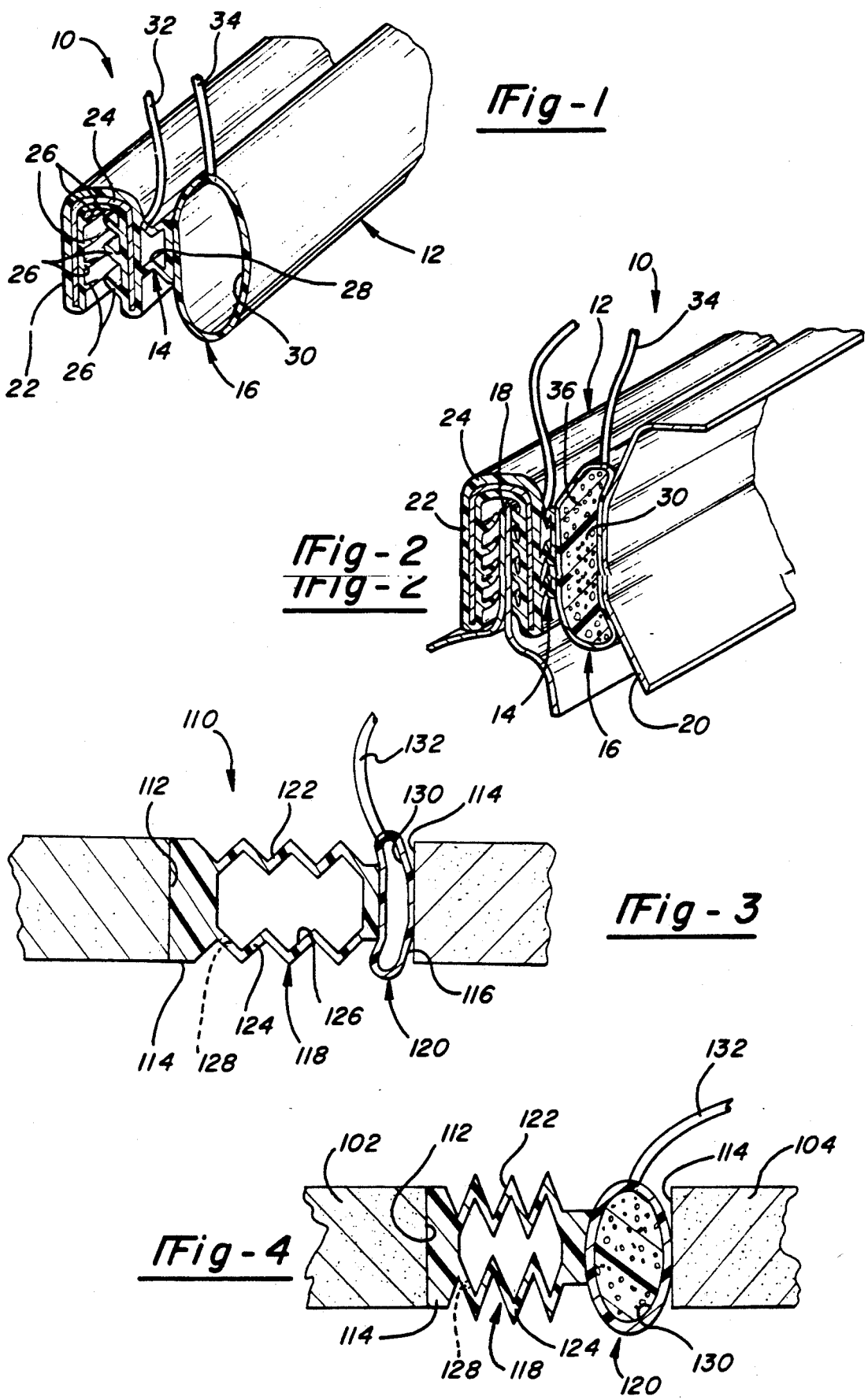

VARIABLE GAP FILLING SYSTEM

BACKGROUND OF THE INVENTION

The present invention relates to an article and method for filling and sealing of a gap between two contiguous surfaces. More specifically, the present invention relates to an elongated weatherstrip type member for molding to, filling and sealing of a variable gap between two members such as concrete roadway members or spaced flange members or other spaced surfaces in a vehicle.

In the past, it has been a goal in the art to provide advantageous methods for sealing between two adjacent spaced surfaces. This is required in automotive applications, for instance between the doorway and frame of the automobile, to reduce noise and provide a weather tight seal for the interior compartment of the vehicle. In other applications, such as in roadway flanges, it is desired to reduce destructive water seepage through a particular joint, such as an expansion joint, to increase the longevity of the roadway.

In the past, there have been many articles and compositions which have been utilized to fill gaps in roadway surfaces. There have also been many weatherstrips designed to seal gaps in vehicle panels and the like. However, gaps to be filled are not always of standardized dimension, even when designed as such, therefore, effective sealing of gaps has been problematic. For instance, while various gaps found in a vehicle are designed to be a certain dimension, because of production tolerances; fitting of parts during production; wear and tear on the vehicle; and even because of vehicle use, a particular gap may have variable dimensions along the length of the gap. Also, weather variables may cause the dimensions of a gap to either expand or contract thereby reducing the possibility of a proper fit. As a result of these factors the effectiveness of a weatherstrip seal is reduced.

In a roadway construction type setting the sections forming a roadway contract and expand due to environmental factors. Therefore, it is desirable to provide a gap sealing which will contract and expand with the panels during these movements to effectively seal the joint.

Thus, it has been a goal in the art to provide a simple sealing article which could provide advantageous sealing properties for variable width dimension gap type situations. In accordance with these goals, the present invention provides an advantageous sealing strip which can be applied to many uses wherein a variable gap is required to be sealed.

SUMMARY OF THE INVENTION

In accordance with the present invention there is provided a variable gap sealing article for sealing between a first surface and a second surface which are spaced from one another. The article includes an elongated body portion having a width. A first sealing surface is provided on the first side of the width for sealing against the first surface and a second sealing surface is provided on a second side of the width for sealing against the second surface. The body portion includes a first resilient contractible portion and a second expandable and conforming portion. The first portion may be compressed or contracted and the second portion expanded for conforming to the second surface. The second portion is retained in the expanded and conformed position thereby bridging the gap between the first surface and the second surface and holding the contractible portion in a contracted position whereby the resiliency of the contracted portion biases the article toward expansion of its width for assuring sealing between the first surface and the second surface.

In accordance with the method aspects of the present invention, an article as set forth above is utilized to fill a gap or a space between a pair of contiguous spaced surfaces by positioning the article between the surfaces. Thereafter, the expandable portion is expanded and the contractible portion is contracted or compressed to fill the space and leave the contractible portion in the contracted position. The expandable portion also conforms to inconsistent varying width gaps between the surfaces and secured in the expanded position. This effectively bridges the gap and the resiliency of the contractible portion biases toward expansion of the width of the article to produce a positive pressure type seal between the surfaces.

Further advantages of the present invention will be readily appreciated by those skilled in the art in light of the description of the preferred embodiments given below and the drawings set forth herein.

BRIEF DESCRIPTION OF THE DRAWINGS

FIG. 1 is a perspective view of a weatherstrip type variable gap sealing article made in accordance with the teachings of the present invention;

FIG. 2 is a perspective view and in cross-section showing a typical application of the weatherstrip invention made in accordance with the teachings of the present invention;

FIG. 3 is a cross-sectional view of an alternate embodiment of the present invention utilized in sealing between two roadway panels or the like; and FIG. 4 is a cross-sectional view similar to FIG. 3, showing the gap sealing article in its expanded position with the contractible portion contracted.

DESCRIPTION OF THE PREFERRED EMBODIMENT

Referring now to the drawings there is provided a variable gap sealing article generally shown at 10. The sealing article 10 is adapted for sealing between a first surface and a second surface which are contiguous and spaced from one another.

In accordance with the broadest aspects of the present invention, the article includes an elongated body portion, generally indicated at 12, which has a suitable width for closely bridging the gap between the two surfaces. The body portion includes a resilient contractible portion, generally indicated at 14, and a second expandable and conformable portion, generally indicated at 16. The present invention incorporates a means for contracting the contractible portion and expanding at least the width of the expandable portion for conforming to the second surface while also retaining the expandable and conformable portion in the expanded position. Thus, when this is accomplished the expandable and conformable portion bridges the gap between the first surface and the second surface and conforms to the second surface. The resiliency of the contracted or compressed contractible portion 14 biases the article toward expansion of its width for providing a positive pressure type sealing between the first and second surface.

Referring now to FIGS. 1 and 2 there is a variable gap sealing article 10 for use in sealing between a flange 18 of a vehicle frame and a vehicle door 20. In this embodiment of the present invention the elongated body portion 12 is made of an elastomeric material, such as EPDM rubbers or the like, and includes a first portion 22 for attachment to the flange 18. The portion 22 includes a steel U-shaped core member 24 which is embedded in an elastomeric coating forming the securement projections 26 for securing the elongated body portion 12 to the flange 18. Of course, other means of securement, such as clips, tape and the like which are readily known in the art, could be substituted for the securement projections 26. In a preferred embodiment of the present invention the contractible portion is an elongated chamber 28 formed by V-shaped walls in the central portion of the body 12. The V-shaped walls are adapted to bend inwardly upon collapse of portion 14 and are resilient. A second chamber 30 is provided which provides for the expandability of at least the width of portion 16 and also provides for conformability to the vehicle door 20 as will be described in further detail below. The walls of chamber 30 are elastic such that they will expand or conform upon internal pressure in the chamber 30. As illustrated in the figures, this may be accomplished by providing a thinner wall about chamber 30 when forming the article.

As described above, it is necessary to expand or conform the expandable or conformable portion while also contracting the contractible portion 14 to bridge the gap between the flange 18 and the vehicle door 20 when they are contiguous to one another. Thus, in accordance with the present invention there is provided a means for contracting the contractible portion and expanding the expandable portion 16 to provide a final structure which bridges the gap and conforms to vehicle door 20 and resiliently retains the seal between the door 20 and the flange 18 to provide an improved positive pressure seal throughout the gap.

In a preferred embodiment of the present invention, this can be accomplished by evacuating the chamber 28 by way of a tube 32. This contracts portion 14 along with the overall width of the elongated body member 12 and prepares it for the next step of the present method.

In accordance with the next step of the present invention, while the door 20 and the flange 18 are contiguous with one another, such as with the vehicle door in the door closed position for instance, and the chamber 14 is evacuated, such as shown in FIG. 2, a hardening substance may be injected into the chamber 30 for expanding the chamber 30 thus widening the expandable portion and conforming the walls of the chamber 30 to the door surface 20. This may be accomplished by injecting a liquid under pressure or by injecting an expanding foaming type substance through tube 34 which will tend to expand the chamber 30 and take up the gap between flange 18 and door 20. During this expansion process the expandable portion 16 also conforms itself to the various dimensional widths and imperfections in the particular gap to be filled.

The substance injected into the chamber 30 is preferably an elastomeric type foaming material, such as an elevated temperature kickoff expanding one part urethane or polyurethene foam. RTV silicone sealant materials could be used which would harden such that the portion 30 would retain its conformed shape after curing of the material 36 in the cavity 30.

Alternately, the expandable or conformable portion 30 of the weatherstrip can be pre-filled with a displaceable substance such as liquid, gel, beads or the aforementioned polyurethane. Door closure causes this substance (liquid, gel, beads or urethane) to be displaced and conform perfectly to its mating surface of the door 20. This displaced substance is now made to undergo an expansion or cure for solidifying the substance by the application of physical, chemical or electrical means such as heat in the case of the aforementioned polyurethane material. With the substance contained in the expandable and conformable portion having been cured, it now has the physical properties of being rigid or a combination of rigid and resilient to provide the desired mating seal.

Thus, upon curing of the material in chamber 30, the vacuum in chamber 28 is released and the chamber 28 is vented into the atmosphere which would allow the resiliency of the portion 14 to bias towards expansion of the width of the weatherstrip to ensure a tight sealing engagement with the door 20 thereby producing a uniform positive pressure type seal against the door 20.

In an alternate embodiment the positive pressure seal may be increased if desired by pumping of a fluid into chamber 28. This would tend to expand the chamber 28 to increase the positive pressure seal against the door 20. This may be accomplished by directing air flow from along the surface of a moving vehicle into the chamber, by air scoops, ducts, vents or the like. In accordance with such a configuration the integrity of the seal would actually be tightened as the speed of the vehicle increases, rather than loosening of the seal with increased speed, as is common in the prior art.

In an alternate embodiment of the method of the present invention the tube 32 could be used merely as a vent such that when the vehicle door surface 20 is adjacent to the flange 18 in a normal position the tube 34 could be used to pump under pressure a material into the chamber 30 or an expandable material to provide expansion of the chamber 30 and to provide at the same time contraction of the center portion 14. This would have the same effect as the earlier embodiment in that contraction and pre-stressing of the portion 14 would be accomplished while at the same time the chamber 30 would be filled with a hardening substance such that the chamber 14 will be biased toward expansion of the width of the weatherstrip for sealing against the door portion 20.

Referring now to FIGS. 3 and 4 there is shown an alternate embodiment of the present invention useful in forming a seal between a pair of roadway surfaces 102 and 104, for instance. The article 110 is adapted for sealing between a first surface of a roadway 112 and a second surface of a roadway 114. In accordance with this embodiment of the present invention, a first sealing portion 114 is provided for sealing against the first surface 112 and a second sealing portion 116 has a surface thereof for sealing against the second portion 114.

In accordance with this embodiment of the present invention there is also incorporated a contractible portion 118 and expandable portion 120. The contractible portion 118 in this embodiment includes a pair of accordion like walls 122 and 124 for forming a chamber 126. Chamber 126 is vented to the atmosphere by vent 128. A second chamber 130 is provided in the expandable portion 120 which includes an injection tube 132 for injecting a suitable substance into the chamber 130.

In accordance with the method of this invention the article 110 is placed in between the first surface 112 and the second surface 114 and thereafter the chamber 130 is expanded by pumping of a solidifying substance, which in this application may be a cementatious material, a bitumen or asphalt or the like, into the chamber 130. The solidifying substance is injected into the chamber 130 under pressure for expanding of the chamber 130 and hardening therein. This compresses the accordion like walls 122 and 124. Thus, this expands the width of the portion 120 and contracts the contractible portion 118 to provide resilient expansion of the article between surfaces 112 and 114. This effectively seals off the space and allows for expansion and contraction of the panels 102 and 104 forming surfaces 112 and 114 while retaining contact to provide good seal therebetween.

While the above description constitutes preferred embodiments of the present invention it is to be appreciated that the invention is susceptible to modification, variation and change without departing from the proper scope and fair meaning of the accompanying claims.

What is claimed is:

1. A variable gap sealing article for sealing between a first surface and a second surface spaced from one another, said article comprising:
   an elongated body portion having a width, a first sealing surface on a first side of said width for sealing against said first surface and a second sealing surface on a second side of said width for sealing against the second surface; said body portion including a resilient first contractible portion and a second expandable and conformable portion; and
   means for contracting said first contractible portion into a contracted position and expanding said second expandable portion into an expanded position such that the expandable portion conforms to the shape of said second surface, the means for contracting and expanding including means for accepting a hardening substance, said hardening substance retaining the expandable portion in the conformed shape and the contractible portion in the contracted position, wherein the resiliency of the contractible portion biases the article against the first surface and the second surface, and wherein the width of the expanded expandable portion and the contracted contractible portion varies in width for bridging the gap between the first surface and the second surface.

2. The article of claim 1 wherein said means comprise a first chamber along the length of said article adapted for contraction and a second chamber along the length of said article adapted to expansion of said expandable portion.

3. The article of claim 2 wherein said second chamber is filled with an expanding substance.

4. The article of claim 3 wherein said expanding substance further comprises an elevated temperature kickoff, one part urethane.

5. The article of claim 2 wherein said second chamber is expanded with a fluid under pressure and wherein said fluid cures to a solid state.

6. The article of claim 2 wherein said first chamber is formed in said body portion by a pair of opposed V-shaped walls.

7. The article of claim 2 wherein said first chamber is formed in said body portion by a pair of accordion-like walls.

8. A variable gap sealing article for sealing between a first surface and a second surface spaced from one another comprising: an elongated body portion made of an expandable elastomeric material, said body portion including a first sealing surface for sealing against said first surface and a second sealing surface for sealing against said second surface, said first and second sealing surfaces running along the width of said elongated body portion; said body portion including first walls defining a first chamber and a second walls defining a second chamber; said first chamber including means for accepting a self curing substance, wherein the curing substance causes the first chamber to conform to the shape of the first sealing surface and remain in the conformed shape and causes the second chamber to be retained in a compressed position while said variable gap sealing article is positioned between said first surface and said second surface, and wherein the walls of the second chamber are resilient so as to bias the body portion thereby acting to seal the gap between the first surface and the second surface and to conform to said second surface during alignment therebetween.

9. The article of claim 8 wherein said walls forming said second chamber further comprise a pair of opposed V-shaped walls.

10. The article of claim 8 wherein said walls forming said second chamber further comprise a pair of accordion-like walls.

11. A vehicle weatherstrip for adapting to a variable gap between a first vehicle surface and a second vehicle surface adjacent to one another, for improved sealing therebetween, comprising:
   an elongated body portion having a width, said body portion including: a first means for sealingly attaching said body portion to said first vehicle surface; a second means for releasably contracting the width of said body portion of said weatherstrip while the weatherstrip is contiguous with said second vehicle surface; a third means for expanding a portion of the width of said body portion of the weatherstrip to an expanded position and maintaining the portion of the width of the body portion in the expanded position and the second means in a contracted position upon the release of said second means, said third means including means for accepting a hardening substance, wherein the hardening substance causes the portion of the width of the body portion in the expanded position to conform to the shape of the second vehicle surface and remain in the conformed shape, said second means being resilient for biasing said third means into said second vehicle surface for conforming to said second vehicle surface and thereby providing a positive seal to said second vehicle surface.

12. The vehicle weatherstrip of claim 11 wherein said second means further comprises an elongated chamber running along the length of aid body portion, said chamber being contractible by drawing a vacuum on said chamber.

13. The weatherstrip of claim 12 wherein said chamber is formed by a pair of spaced V-shaped walls in said body portion.

14. The weatherstrip of claim 12 wherein said chamber is formed by a pair of spaced accordion-like walls.

15. The weatherstrip of claim 12 further comprising a means for directing a pressurized fluid into said chamber for increasing the biasing toward expanding the width of said body portion of the weatherstrip.

16. The vehicle weatherstrip of claim 11 wherein said third means further comprises an elongated chamber in said body portion, said chamber being expanded by the injection of a fluid into said chamber.

17. A vehicle weatherstrip for adapting to a variable width gap between a first vehicle surface and a second vehicle surface adjacent to one another, for improved sealing therebetween, said weatherstrip comprising:
   an elongated body having a width defined by a first securement portion, a contractible portion and an expandable portion;
   a means for attachment of said securement portion to said first vehicle surface;
   a first elongated chamber formed in said contractible portion, said first chamber allowing for contraction of the width of said contractible portion, said contractible portion being resilient for expanding after contraction thereof; and
   a second elongated chamber formed in said expandable portion, said second chamber including means for accepting a hardening substance, wherein the hardening substance causes the second chamber to expand to an expanded position and conform to the shape of the second vehicle surface, the hardening substance also causing the expandable portion to retain the conformed shape so as to expand the width of said elongated body for adapting to the variable width gap between said first vehicle surface and said second vehicle surface and conforming to said second vehicle surface, said second chamber retaining the contractible portion in a contracted position wherein the resiliency of the contractible portion biases toward expansion of the width of said body portion for providing a positive pressure seal between said first vehicle surface and said second vehicle surface.

18. The vehicle weatherstrip of claim 17 further comprising a means for injecting a fluid under pressure into said first elongated cavity for expanding said cavity to increase said positive pressure seal.

19. The vehicle weatherstrip of claim 18 wherein said means further comprises a means for directing the airflow pressure, of the vehicle while in motion, into said cavity.

20. The vehicle weatherstrip of claim 17 wherein said first elongated chamber is formed by a pair of spaced V-shaped walls.

21. The vehicle weatherstrip of claim 17 wherein said first elongated chamber is formed by a pair of spaced accordion-like walls.

22. An article for conforming to and sealing of first and second vehicle surfaces forming a gap of a predetermined maximum width there between wherein the first vehicle surface and the second vehicle surface are movable with respect to one another from a first fixed position adjacent said first surface for forming said gap and a second position wherein said first surface and said second surface are removed from one another, said article comprising:
   an elongated body having a width greater than said predetermine maximum width of said gap, said width defined by a first securement portion, a resilient compressible portion and a chamber formed by a conformable wall portion, said chamber being filled with a substance having fluid flow properties, wherein the chamber causes the resilient compressible portion to be retained in a compressed position such that the resiliency of compressible portion biases the chamber;
   a means for attachment of said securement portion to one of said first vehicle surface and said second vehicle surface;
   a means for allowing expulsion of a portion of said substance from said chamber when said article is interposed between said first surface and said second surface and said first surface and said second surface are moved from said second open position to said first gap defining position, due to said other one of said first surface and second surface causing said conforming wall portion to conform to said other one of said first surface and said second surface; and
   a means for solidifying said substance in said chamber such that the conforming wall portion is maintained in a conformed shape with respect to said other one of said first surface and said second surface for effectively bridging the gap and the compressible portion is maintained in a compressed position.

* * * * *

UNITED STATES PATENT AND TRADEMARK OFFICE
CERTIFICATE OF CORRECTION

PATENT NO. : 5,181,341

DATED : January 26, 1993

INVENTOR(S) : James F. Keys et al

It is certified that error appears in the above-identified patent and that said Letters Patent is hereby corrected as shown below:

Column 5, line 53, Claim 2, "to" should be -- for --

Column 6, line 10, Claim 8, delete second occurrence of "a"

Column 6, line 57, Claim 12, "aid" should be -- said --

Signed and Sealed this

Twenty-third Day of November, 1993

*Attest:*

BRUCE LEHMAN

*Attesting Officer*          *Commissioner of Patents and Trademarks*